United States Patent
Tsao et al.

(10) Patent No.: US 10,217,043 B2
(45) Date of Patent: Feb. 26, 2019

(54) ULTRAHIGH FREQUENCY RFID TAG ANTENNA WITH MULTI-INFEED

(71) Applicant: HON HAI PRECISION INDUSTRY CO., LTD., New Taipei (TW)

(72) Inventors: Yu-Hung Tsao, New Taipei (TW); Fu-Yen Hsieh, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/607,416

(22) Filed: May 26, 2017

(65) Prior Publication Data

US 2017/0344871 A1 Nov. 30, 2017

(30) Foreign Application Priority Data

May 28, 2016 (CN) .......................... 2016 1 0363930

(51) Int. Cl.
*G06K 19/077* (2006.01)
*G06K 19/07* (2006.01)

(52) U.S. Cl.
CPC ... *G06K 19/07773* (2013.01); *G06K 19/0724* (2013.01); *G06K 19/07754* (2013.01)

(58) Field of Classification Search
CPC ............................................... G06K 17/07773
USPC ........................................ 235/492; 340/10.1
See application file for complete search history.

(56) References Cited

U.S. PATENT DOCUMENTS

| 6,975,834 B1* | 12/2005 | Forster ............... G06K 19/0724 343/728 |
| 2007/0069037 A1* | 3/2007 | Kawai .............. G06K 19/07749 235/492 |
| 2008/0266191 A1* | 10/2008 | Hilgers ................ H01Q 1/2225 343/726 |
| 2010/0109840 A1* | 5/2010 | Schilling ............ G06K 7/10346 340/10.1 |
| 2015/0116168 A1* | 4/2015 | Yosui ....................... H01Q 7/00 343/722 |
| 2016/0148025 A1* | 5/2016 | Ohashi ............... G06K 7/10128 340/10.1 |
| 2016/0173184 A1* | 6/2016 | Tian ..................... H04B 7/0697 375/267 |
| 2017/0162952 A1* | 6/2017 | Zeng ..................... H01Q 21/30 |
| 2018/0089475 A1* | 3/2018 | Hattori ............... G06K 7/10346 |

FOREIGN PATENT DOCUMENTS

CN 202042596 * 4/2011

* cited by examiner

*Primary Examiner* — Allyson Trail
(74) *Attorney, Agent, or Firm* — ScienBiziP, P.C.

(57) ABSTRACT

An ultrahigh frequency RFID tag antenna with multi-infeed includes an antenna assembly, a baseboard, and a ground plane. The baseboard is located above the ground plane. The antenna assembly is electrically connected to the ground plane. The antenna assembly includes a radiated element, a number of microstrip lines, and a number of tag chips. Each of the tag chips is connected between each two microstrip lines, thereby a microstrip feed loop is formed by each of the tag chips and the each two microstrip lines.

10 Claims, 4 Drawing Sheets

ULTRAHIGH FREQUENCY RFID TAG ANTENNA WITH MULTI-INFEED

CROSS-REFERENCE TO RELATED APPLICATIONS

This application claims priority to Chinese Patent Application No. 201610363930.2 filed on May 28, 2016, the contents of which are incorporated by reference herein.

FIELD

The subject matter herein generally relates to antenna technology, and particularly to an ultrahigh frequency RFID tag antenna with multi-infeed.

BACKGROUND

Generally, an electronic tag includes an antenna and a tag chip. The antenna is used for exchanging data with a reader by transmitting and receiving electromagnetic waves, thus implementing a function of RFID identification. However, the antenna usually includes only one feeder point, and an RFID antenna with a single feed may not satisfy user requirements.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
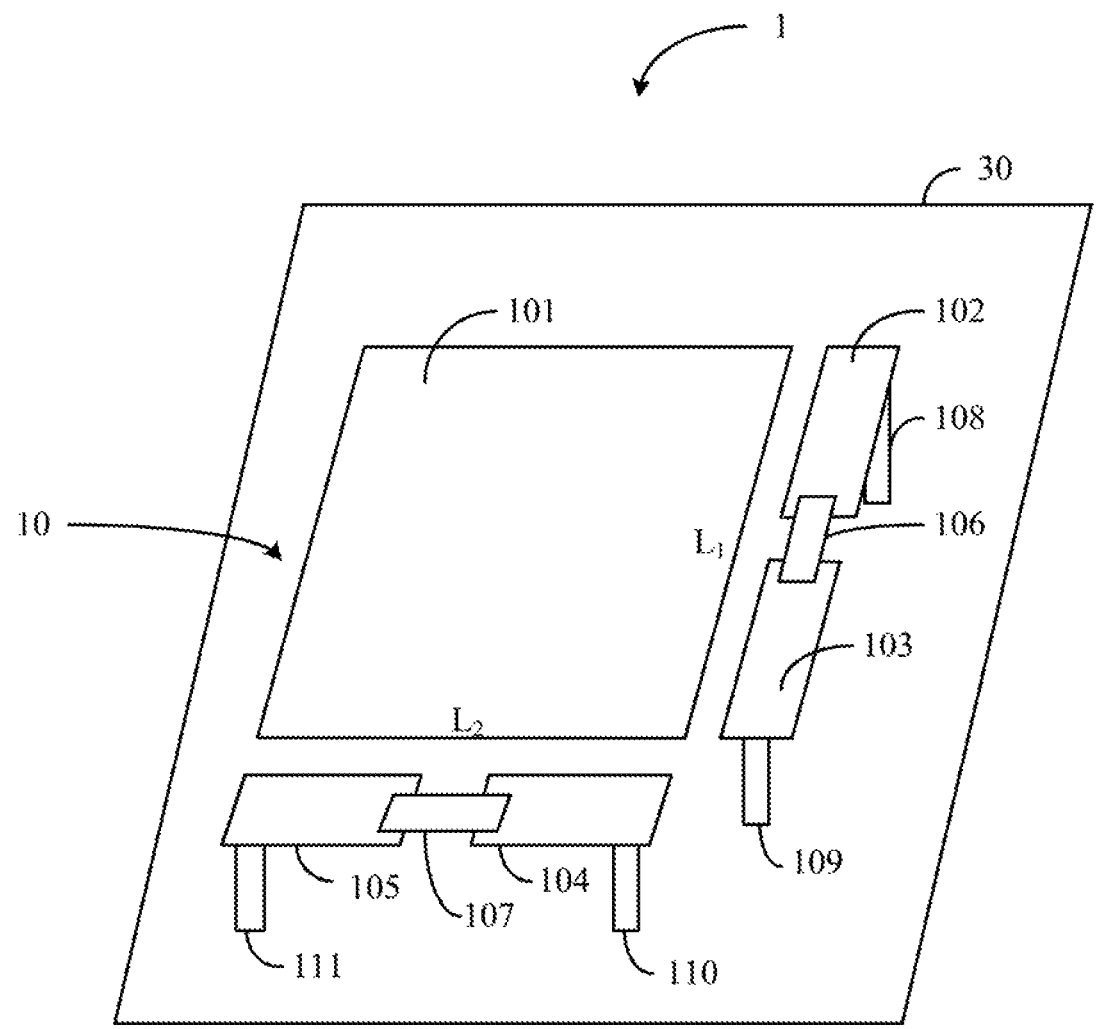
FIG. 1 is a schematic view illustrating a first exemplary embodiment of an ultrahigh frequency RFID tag antenna with multi-infeed.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" exemplary embodiment in this disclosure are not necessarily to the same exemplary embodiment, and such references mean "at least one".

The term "comprising" means "including, but not necessarily limited to", it specifically indicates open-ended inclusion or membership in a so-described combination, group, series, and the like.

Figure 2:
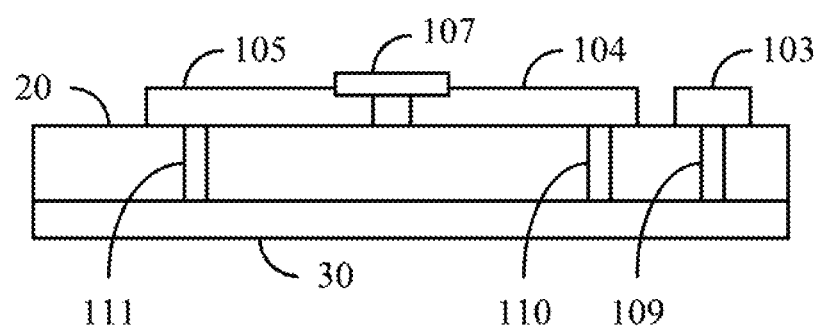
FIG. 2 is a side view of the antenna in FIG. 1.

FIG. 1 illustrates a first exemplary embodiment of an ultrahigh RFID tag antenna 1 with multiple infeeds (multi-infeed). Referring to FIGS. 1-2, in at least one exemplary embodiment, the tag antenna 1 includes, but is not limited to, an antenna assembly 10, a baseboard 20, and a ground plane 30. FIGS. 1-2 illustrate only one example of the tag antenna 1, other examples can include more components than as illustrated.

In at least one exemplary embodiment, the antenna assembly 10 is located above the baseboard 20 and electrically connected to the ground plane 30, the baseboard 20 is located above the ground plane 30.

As illustrated in FIGS. 1-2, the antenna assembly 10 includes, but is not limited to, a radiating element 101, a first microstrip line 102, a second microstrip line 103, a third microstrip line 104, a fourth microstrip line 105, a first tag chip 106, and a second tag chip 107. In at least one exemplary embodiment, the first tag chip 106 is connected between the first microstrip line 102 and the second microstrip line 103, the second tag chip 107 is connected between the third microstrip line 104 and the fourth microstrip line 105, thereby two microstrip feed loops are formed.

In at least one exemplary embodiment, the first microstrip line 102 is electrically connected to the ground plane 30 through a first guiding pillar 108, and the second microstrip line 103 is electrically connected to the ground plane 30 through a second guiding pillar 109. The third microstrip line 104 is electrically connected to the ground plane 30 through a third guiding pillar 110, and the fourth microstrip line 105 is electrically connected to the ground plane 30 through a fourth guiding pillar 111, thereby the antenna assembly 10 is electrically connected to the ground plane 30. In at least one exemplary embodiment, the first guiding pillar 108, the second guiding pillar 109, the third guiding pillar 110, and the fourth guiding pillar 111 can be open-circuit or short-circuited.

In at least one exemplary embodiment, the radiating element 101 can be a rectangular radiating plane. The first microstrip line 102, the second microstrip line 103, and the first tag chip 106 are located near a side $L_1$ of the radiating element 101. The third microstrip line 104, the fourth microstrip line 105, and the second tag chip 107 are located near a side $L_2$ adjacent to the side $L_1$ of the radiating element 101. Thereby the microstrip feed loop formed by the first tag chip 106 and the first and the second microstrip lines 102 and 103 (microstrip feed loop 6-23), and the microstrip feed loop formed by the second tag chip 107 and the third and the fourth microstrip lines 104 and 105 (microstrip feed loop 7-45), are arranged around two adjacent sides of the radiating element 101, increasing the isolation of the tag antenna 1.

Figure 3:
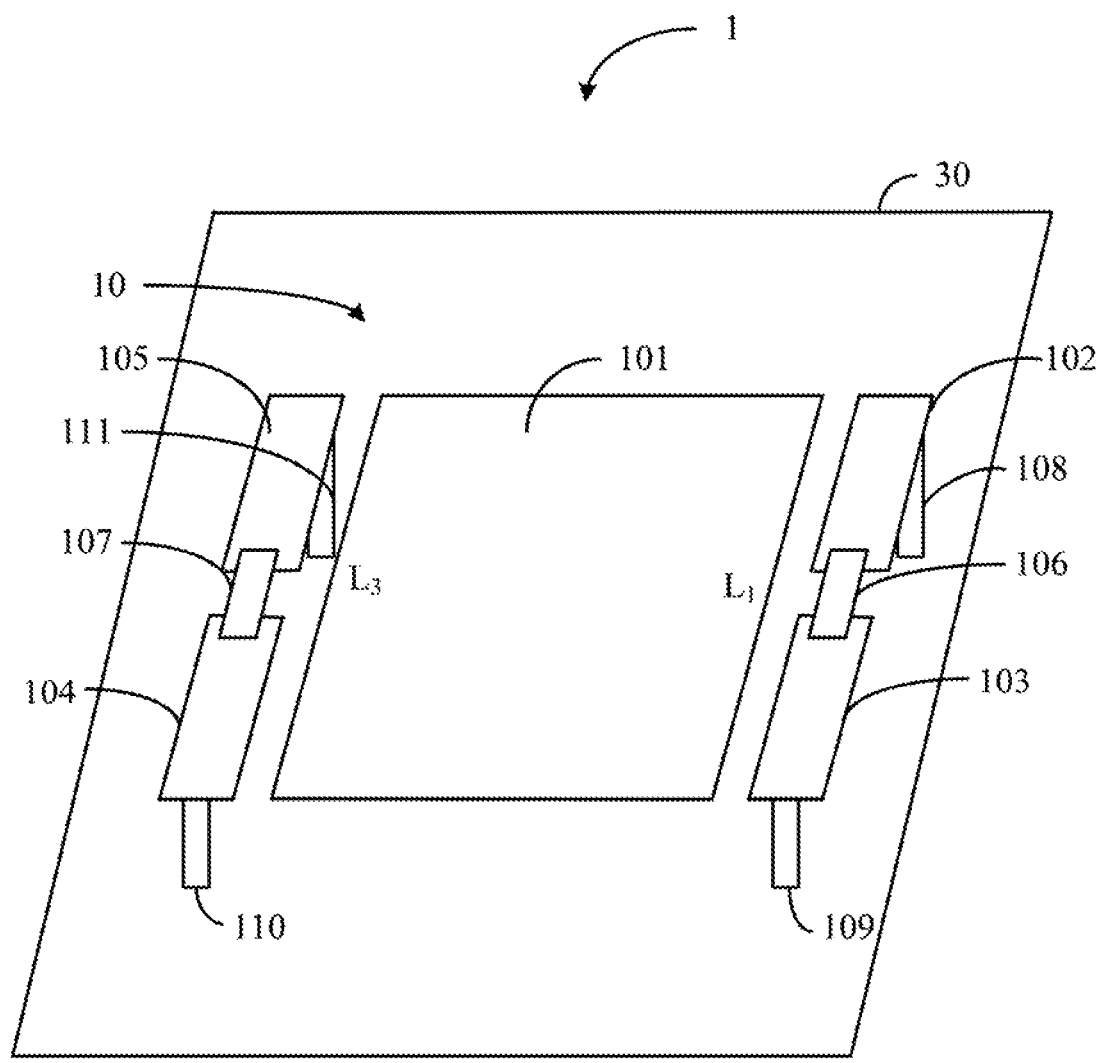
FIG. 3 is a schematic view illustrating a second exemplary embodiment of an ultrahigh frequency RFID tag antenna with multi-infeed.

As illustrated in FIG. 3, in a second exemplary embodiment, the microstrip feed loop 6-23 is located near the side $L_1$ of the radiating element 101, and the microstrip feed loop 7-45 is located near a side $L_3$ facing to the side $L_1$ of the radiating element 101. Thereby the microstrip feed loops 6-23 and 7-45 are arranged around opposing sides of the radiating element 101.

Optionally, in the two illustrated exemplary embodiments, the first tag chip 106 and the second tag chip 107 are the same. When one tag chip breaks down, a tag using the tag antenna 1 still can adopt the other tag chip for identification.

Optionally, in the two illustrated exemplary embodiments, the first tag chip 106 and the second tag chip 107 have different working bands, which allows the tag antenna 1 to meet frequency range standards of RFID equipment of different countries or areas, thereby the tag using the tag antenna 1 can be identified in different countries or areas. For example, the first tag chip 106 has Japanese working band 850 MHz, the second tag chip 107 has European working band 915 MHz, so the tag using the tag antenna 1 can be identified in both Japan and Europe.

Figure 4:
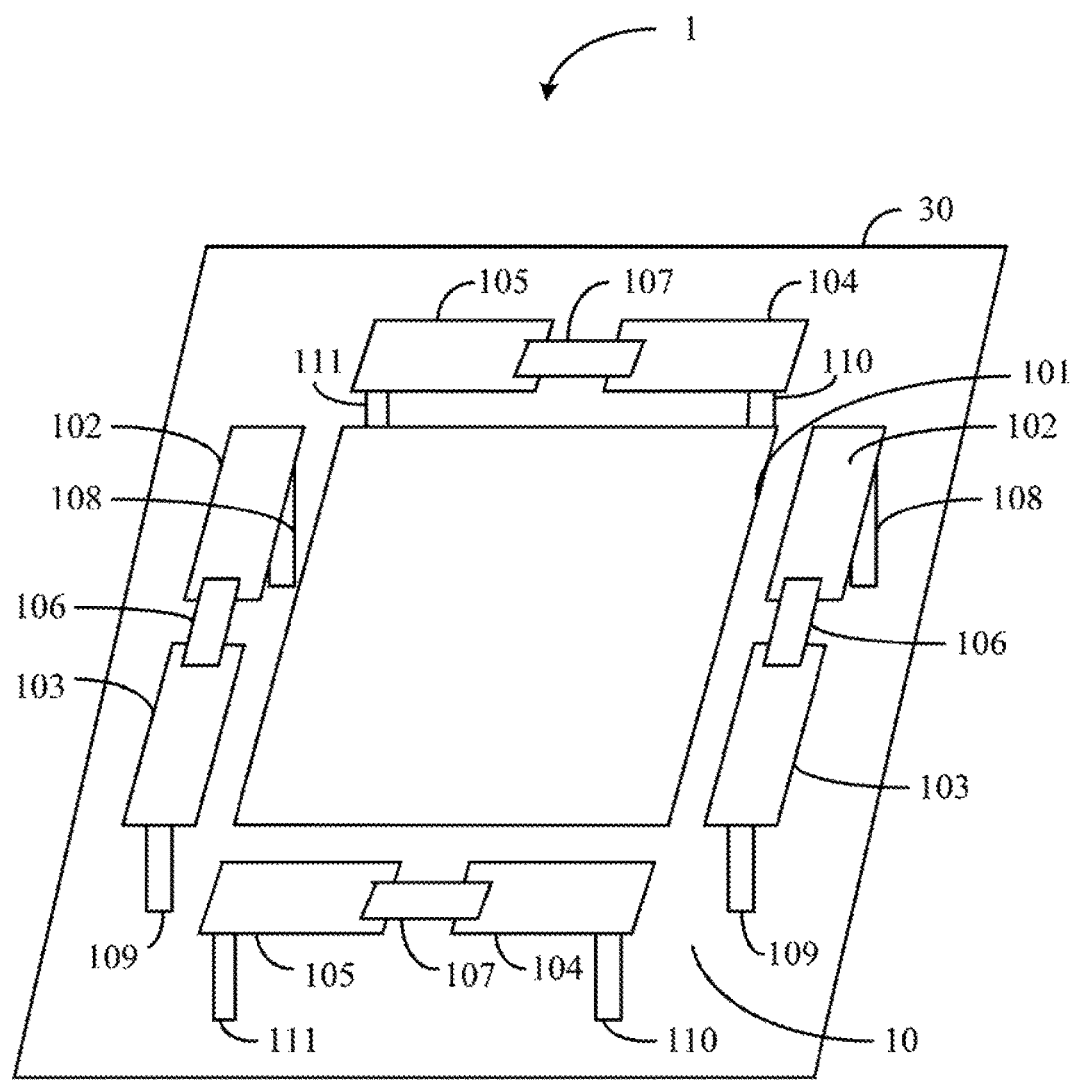
FIG. 4 is a schematic view illustrating a third exemplary embodiment of an ultrahigh frequency RFID tag antenna with multi-infeed.

As illustrated in FIG. 4, in a third exemplary embodiment, the radiating element 101 is also a rectangular radiating plane. The antenna assembly 10 includes the radiating element 101, two first microstrip lines 102, two second microstrip lines 103, two third microstrip lines 104, two fourth microstrip lines 105, two first tag chips 106, and two second tag chips 107. In at least one exemplary embodiment, the two first tag chips 106 are respectively connected between the first microstrip line 102 and the second microstrip line 103, and the two second tag chips 107 are respectively connected between the third microstrip line 104 and the fourth microstrip line 105. Thereby four microstrip feed loops can be formed.

In at least one exemplary embodiment, each of the four tag chips is located near one side of the radiating element 101. In detail, the two first tag chips 106 are respectively arranged around opposing sides of the radiating element 101, the two second tag chips 107 are respectively arranged around the other opposing sides of the radiating element 101. The first tag chip 106 and the second tag chip 107 have different working bands.

In at least one exemplary embodiment, when one of the first tag chips 106 or the second tag chips 107 breaks down, a tag using the tag antenna 1 still can adopt the other tag chip for identification. On the other hand, the first tag chip 106 and the second tag chip 107 have different working bands, which allows the tag antenna 1 to meet the frequency range standards of RFID equipment of different countries or areas, thereby the tag using the tag antenna 1 can be identified in different countries or areas.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An ultrahigh frequency RFID tag antenna with multi-infeed comprising:
   an antenna assembly comprising a radiating element, a plurality of microstrip lines, and a plurality of tag chips;
   a baseboard; and
   a ground plane;
   wherein the baseboard is located above the ground plane, the antenna assembly is electrically connected to the ground plane, each of the tag chips is connected between corresponding two microstrip lines, thereby a microstrip feed loop is formed by each of the tag chips and the corresponding two microstrip lines, each microstrip feed loop is located near one side of the radiating element, and each side of the radiating element has no more than one microstrip feed loop.

2. The ultrahigh frequency RFID tag antenna with multi-infeed according to claim 1, further comprising:
   a plurality of guiding pillars, wherein each of the microstrip lines is electrically connected to the ground plane through one guiding pillar.

3. The ultrahigh frequency RFID tag antenna with multi-infeed according to claim 2, wherein the guiding pillar is open-circuit or short-circuited.

4. The ultrahigh frequency RFID tag antenna with multi-infeed according to claim 1, wherein the radiating element is a rectangular radiating plane.

5. The ultrahigh frequency RFID tag antenna with multi-infeed according to claim 4, wherein the antenna assembly comprises four microstrip lines and two tag chips, the two tag chips are respectively located near two adjacent sides of the radiating element.

6. The ultrahigh frequency RFID tag antenna with multi-infeed according to claim 4, wherein the antenna assembly comprises four microstrip lines and two tag chips, the two tag chips are respectively located near two opposing sides of the radiating element.

7. The ultrahigh frequency RFID tag antenna with multi-infeed according to claim 5, wherein the two tag chips are the same.

8. The ultrahigh frequency RFID tag antenna with multi-infeed according to claim 5, wherein the two tag chips have different working bands.

9. The ultrahigh frequency RFID tag antenna with multi-infeed according to claim 4, wherein the antenna assembly comprises eight microstrip lines and four tag chips, each of the tag chips is located near a side of the radiating element.

10. The ultrahigh frequency RFID tag antenna with multi-infeed according to claim 9, wherein the tag chips arranged around the opposing sides of the radiating element are the same, the tag chips arranged around the adjacent sides of the radiating element have different working bands.

* * * * *